S. SAWYER.
Brake for Bicycles.

No. 225,239. Patented Mar. 9, 1880.

WITNESSES
A. J. Oettinger.
F. F. McClintock.

INVENTOR
Sylvester Sawyer
by his atty
Clarke + Raymond.

UNITED STATES PATENT OFFICE.

SYLVESTER SAWYER, OF GARDNER, MASSACHUSETTS.

BRAKE FOR BICYCLES.

SPECIFICATION forming part of Letters Patent No. 225,239, dated March 9, 1880.

Application filed December 29, 1879.

*To all whom it may concern:*

Be it known that I, SYLVESTER SAWYER, of Gardner, in the county of Worcester and Commonwealth of Massachusetts, have invented an Improvement in Brakes for Bicycles, of which the following is a specification.

This invention has for its object the following-described improvement in brakes for bicycles, and reference is made to the accompanying drawings, forming a part of this specification, in explaining its nature, in which—

Figures 1, 4, 5:
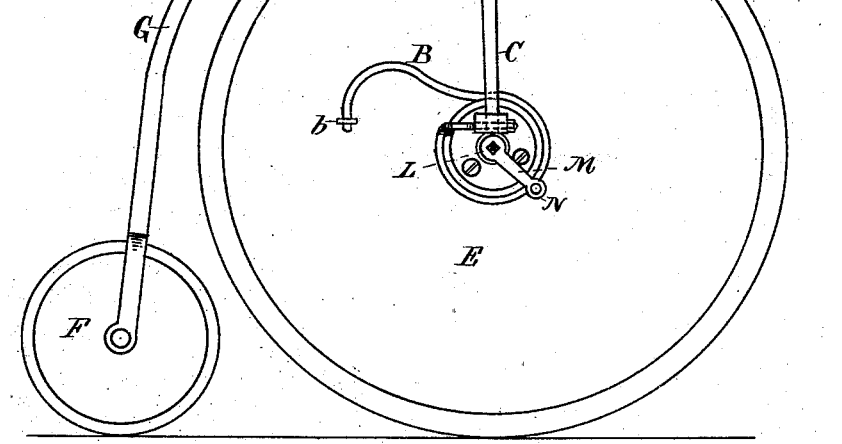
Figures 2, 3:
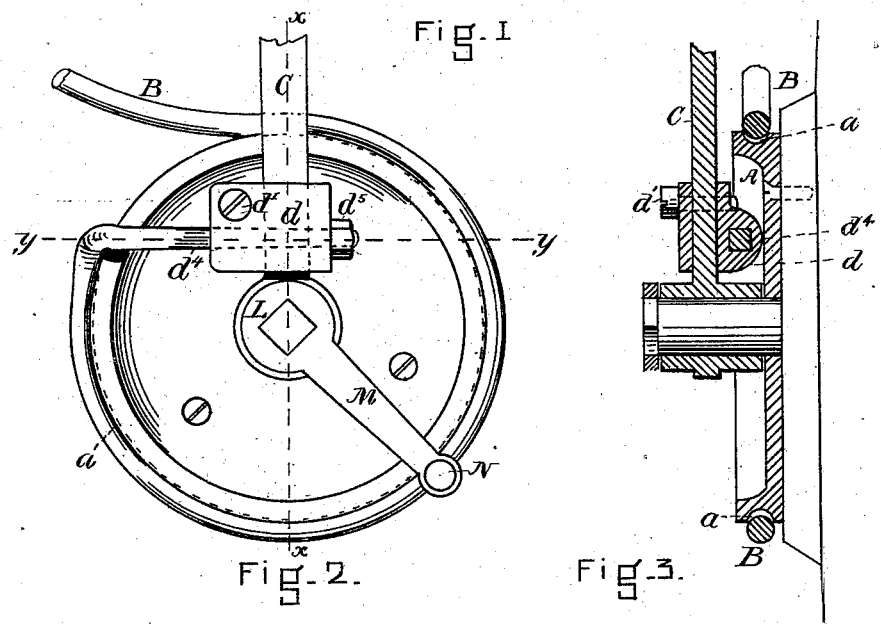

Figure 1 is a side elevation of the bicycle; Fig. 2, an enlarged elevation of the brake. Fig. 3 is a vertical section thereof on the line $x\,x$ of Fig. 2. Fig. 4 is a cross-section on the line $y\,y$ of Fig. 2, and Fig. 5 is a perspective of the clamping mechanism for attaching the end of the brake to one of the forks.

It has been customary, in bicycles, to apply the braking mechanism to the trailing wheel, and to cause the brake to act upon some portion of it; but there are certain disadvantages in this method, among which may be mentioned that, as the weight of the rider is almost entirely borne by the driving-wheel, the trailing wheel, even if completely stopped by the brake and dragged by the driving-wheel, will not operate as rapidly as is sometimes desirable in checking the momentum of the bicycle.

In my invention I attach to the hub of the driving-wheel a disk, A, of metal, having an annular groove, $a$. A spring-arm, B, is attached to one of the forks C of the bicycle in any desirable way, and is curved around the disk A in such a manner that the groove $a$ is almost surrounded by a part of it. The remaining portion of the spring B projects sufficiently to form an arm for operating the brake, and also acts as a guard in shielding the clothing and foot of the rider from contact with the spokes of the driving-wheel.

A step, $b$, or other projection may be fastened to the end of the arm, upon which the foot may be placed in operating the brake and in mounting the bicycle.

As one method of fastening the end of the spring-arm to the fork, I show the clamp $d$, which is adapted to embrace the fork C, and to be clamped thereon by the screw or bolt $d'$, and which is provided with the projection $d^2$, having the hole $d^3$, in which the end of the spring $d^4$ is fastened, either by a nut, $d^5$, arranged to screw upon the end of the arm, or in any other desirable way. I do not, however, intend to confine myself to this means of fastening the end of the braking-arm to the fork. The arm, upon leaving the clamp, should be curved substantially as shown in Fig. 4. It must be so shaped that when not in use the portion that acts as the brake, in connection with the groove $a$, will not be in contact therewith.

In operation, upon the downward movement of the outer portion of the arm the part which surrounds the groove is drawn against the same with greater or less stress, according to the power employed, and the friction between the inner face of this part and the face of the groove upon the flange constitutes the braking power. Upon the removal of pressure from the end of the arm the brake will automatically resume a position free from the groove.

I do not intend to confine myself to a disk upon the hub of a driving-wheel having a grooved flange, but may use any portion of the hub of the wheel, or any disk or other device attached thereto which shall have upon its periphery a surface adapted to be embraced by a clamping-piece passed around it.

Neither do I intend to confine myself to the shape of that portion of the brake which bears upon the flange.

In the drawings, E represents the driving-wheel; F, the trailing wheel; G, the backbone; H, the saddle; I, the head; K, the steering-arm; L, the shaft; M, the crank; N, the pedal.

Having thus fully described my invention, I claim, and desire to secure by Letters Patent of the United States—

1. In a bicycle, the combination of the disk A, fastened to the hub of the driving-wheel, and having a bearing-surface, $a$, the fork C, and a spring-arm, B, attached to the fork, and curved around said bearing-surface $a$, and arranged to be clamped thereon, substantially as and for the purposes described.

2. The combination, in a bicycle, of the clamp $d$, fastening the end of the spring-arm B to the fork C, the said fork C, the said arm B, and the disk A having a bearing-surface, $a$, with which the arm is adapted to contact in applying the brake, substantially as and for the purpose described.

3. In a bicycle, the combination of the hub of the driving-wheel, the fork C, clamping mechanism attached to said fork and adapted to bear upon the driving-wheel, and means for operating said clamping mechanism, substantially as and for the purposes described.

SYLVESTER SAWYER.

Witnesses:
 THATCHER B. DUNN,
 E. D. HOWE.